United States Patent
Ploss

(10) Patent No.: US 9,580,288 B2
(45) Date of Patent: Feb. 28, 2017

(54) WATER DISPENSER COVER

(71) Applicant: Dianna Ploss, Cambridge, MA (US)

(72) Inventor: Dianna Ploss, Cambridge, MA (US)

( * ) Notice: Subject to any disclaimer, the term of this patent is extended or adjusted under 35 U.S.C. 154(b) by 22 days.

(21) Appl. No.: 14/478,656

(22) Filed: Sep. 5, 2014

(65) Prior Publication Data

US 2016/0068381 A1    Mar. 10, 2016

(51) Int. Cl.
*B67D 1/08* (2006.01)
*B67D 1/00* (2006.01)
*B67D 3/00* (2006.01)

(52) U.S. Cl.
CPC .......... *B67D 1/0887* (2013.01); *B67D 1/0004* (2013.01); *B67D 3/0029* (2013.01)

(58) Field of Classification Search
CPC .......... B65D 83/00; B65D 71/36; B65D 3/04; B65D 83/303; B67D 1/0004; B67D 1/0887; B67D 3/0029; B67D 7/005; A61J 7/0046
See application file for complete search history.

(56) References Cited

U.S. PATENT DOCUMENTS

| | | | | |
|---|---|---|---|---|
| 1,849,950 A * | 3/1932 | Murdock | ............... | B65D 47/16 141/309 |
| 4,353,139 A | 10/1982 | Wainwright et al. | | |
| 4,622,704 A | 11/1986 | Chung | | |
| 5,848,729 A * | 12/1998 | Thornton | ............. | B65D 83/682 222/190 |
| 6,311,864 B1 * | 11/2001 | Land | ....................... | B65D 47/06 220/718 |
| 6,751,813 B2 * | 6/2004 | Chung | ................ | A61M 3/0258 4/443 |
| 6,866,166 B2 * | 3/2005 | Mehes | .................... | A47F 1/085 222/132 |
| 7,387,063 B2 * | 6/2008 | Vu | ......................... | A47J 31/007 206/217 |
| 8,276,615 B2 | 10/2012 | Weber | | |
| 8,382,012 B2 | 2/2013 | Park et al. | | |
| 8,501,118 B2 * | 8/2013 | Mathus | .................. | B01L 3/0279 422/501 |
| 2003/0183661 A1 * | 10/2003 | Finley | .................. | B65D 47/243 222/525 |
| 2005/0227029 A1 * | 10/2005 | Dart | ........................ | B65D 1/265 428/36.5 |
| 2006/0011669 A1 * | 1/2006 | Massey | ..................... | B67D 3/04 222/563 |
| 2006/0049206 A1 * | 3/2006 | Correia | ................ | B67D 3/0029 222/146.6 |
| 2006/0144242 A1 * | 7/2006 | Mitchell | ............... | A47J 31/407 99/275 |

(Continued)

FOREIGN PATENT DOCUMENTS

| | | |
|---|---|---|
| AU | 2002100993 | 6/2003 |
| CN | 2750136 | 1/2006 |
| WO | 2007011838 | 1/2007 |

*Primary Examiner* — Frederick C Nicolas
*Assistant Examiner* — Bob Zadeh
(74) *Attorney, Agent, or Firm* — Lambert & Associates; Gary E. Lambert; David J. Connaughton, Jr.

(57) ABSTRACT

A water spout sanitary cover is provided. The cover is disposable and is configured to fit over a portion of the water spout to provide a sanitary layer. The cover may prevent microbial transfer between the spout, water, and a vessel being filled with water. The cover is disposable, and replaceable, and may be provided in a stacked dispenser.

16 Claims, 2 Drawing Sheets

(56) References Cited

U.S. PATENT DOCUMENTS

| | | | |
|---|---|---|---|
| 2007/0215618 A1* | 9/2007 | Wright | B65D 81/3876 |
| | | | 220/62.12 |
| 2010/0139496 A1* | 6/2010 | Santoiemmo | B67D 1/0888 |
| | | | 99/323.2 |
| 2011/0084085 A1 | 4/2011 | McPeck | |
| 2014/0061256 A1* | 3/2014 | Norgaard | A01M 1/02 |
| | | | 222/562 |

* cited by examiner

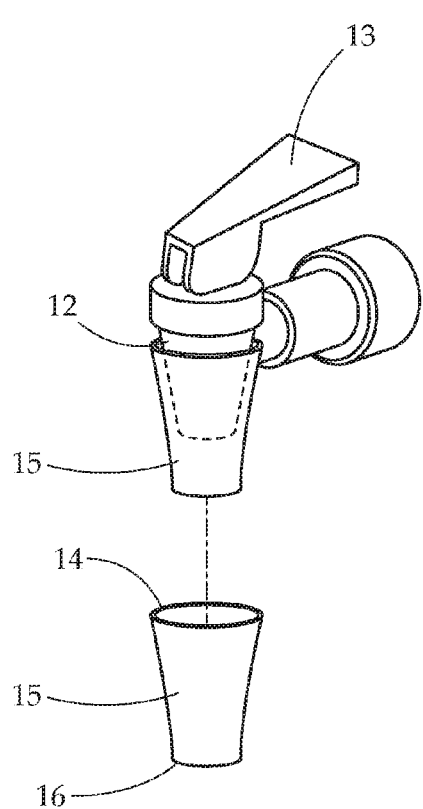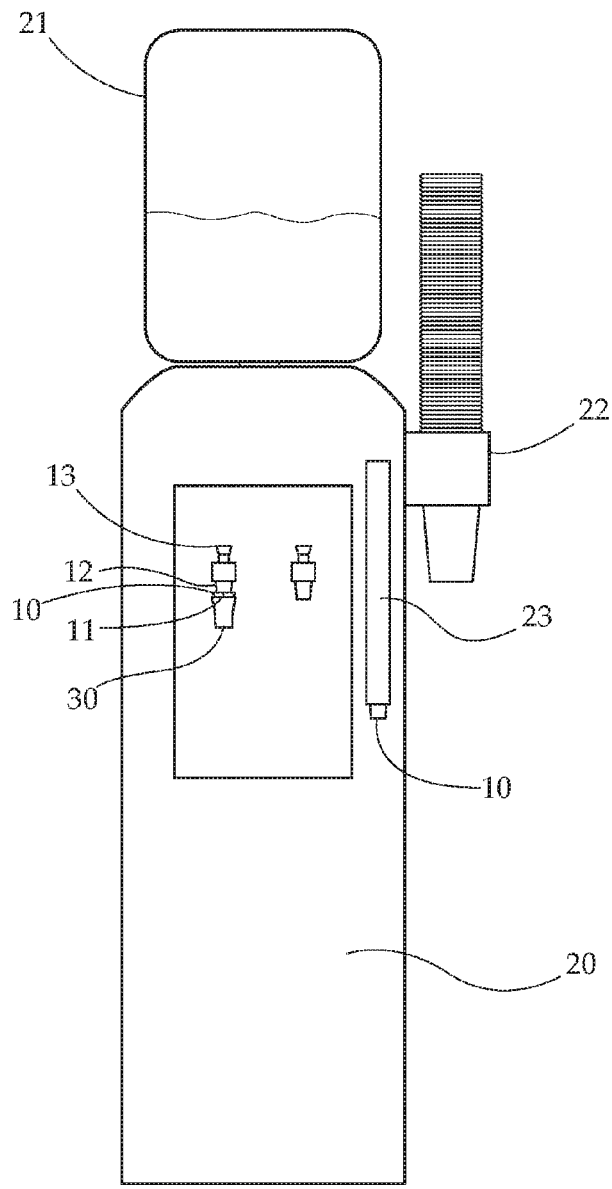
Fig. 1
Fig. 2

WATER DISPENSER COVER

BACKGROUND OF THE INVENTION

Field of the Invention

The present invention relates generally to sanitary covering devices for water dispensers. More particularly, the present invention relates to a disposable spout cover that fits over or into a water dispensing spout.

Description of Related Art

Water spouts, such as public water dispensers, Poland Spring®, water coolers, and the like are all venues for substantial bacterial, fungal, and other microbial growth. This microbial growth is caused by the presence of water, and contaminants in the air and from the multiple contacts of user's bodies, water vessels, and the like. As such, many illnesses can be passed and fostered by these water spouts, and exposure thereto. For example, if a sick person drinks water from a vessel and then refills the vessel from the water spout, upon a contact of the spout and vessel, it is likely that the sick person's germs will be transferred to the spout. After a while, in the moist, growth-encouraging environment of the spout, these germs will grow, and can be easily transferred to any other water vessel or source of the water from the spout.

Therefore, what is needed is a device that may efficiently and conveniently prevent microbial transmission from the water spout to the water vessel of the user, and that may also prevent microbial transmission from the water vessel to the water spout.

SUMMARY OF THE INVENTION

The subject matter of this application may involve, in some cases, interrelated products, alternative solutions to a particular problem, and/or a plurality of different uses of a single system or article.

In one aspect, a water dispenser spout cover assembly is provided. The assembly comprises a water dispenser and a water spout cover. The water dispenser comprises a body, a water source (such as a jug, or a plumbed-in connection, among others), and a water spout extending from the body, serving as a water outlet. A water spout cover is removably attached to the water spout. This water cover is substantially conically shaped, having a wide opening on a first end, and tapering to a narrower opening on a second, opposite end. The wide opening and interior of the cover is configured to snugly fit over the water spout.

In another aspect, a water dispenser spout cover assembly is provided. The assembly comprises a water dispenser and a water spout cover. The water dispenser comprises a body, a water source (such as a jug, or a plumbed in connection, among others), and a water spout serving as a water outlet extending from the body. A water spout cover is removably attached to the water spout. This water cover is substantially conically shaped, having a wide opening on a first end, and tapering to a narrower opening on a second, opposite end. The wide opening tapers inward so that a portion of the cover is sized to snugly fit into an interior of an opening the water spout.

BRIEF DESCRIPTION OF THE DRAWINGS

FIG. 1 provides a perspective view of the spout and its orientation and connection to an embodiment of the spout cover is shown.

FIG. 2 provides another embodiment of the invention mounted on a water dispenser.

DETAILED DESCRIPTION

Figure 3:
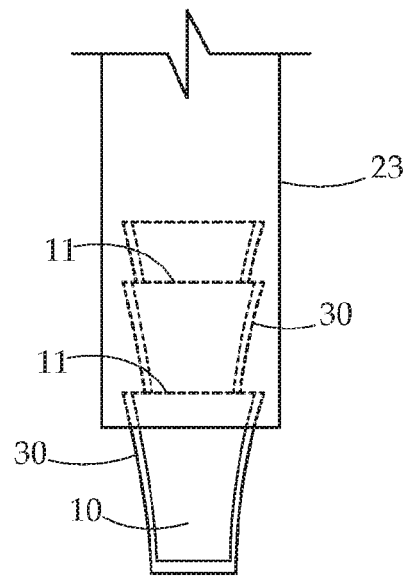
FIG. 3 provides a view of the water spout covers in a stacked position.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a sanitary cover for a water spout, such as a Poland Spring® or similar water dispenser having a spout out of which water is dispensed. The cover is configured to removably attach to the spout such that a user may place it over the spout, fill their water container, and then remove the cover from the spout. In varying embodiments, the cover may fit into an interior of the spout, or may fit over an exterior of it. In further embodiments, the cover may further comprise a powdered or concentrated flavoring on its interior. As water passes through the cover, the flavoring will dissolve or be diluted and flavor the water.

The purpose of the present invention is to provide a sanitary solution to the often very unsanitary water dispensing spouts seen at gyms, offices, stores, and other public places. By providing a covering to the water spouts, much of the microbe and pathogen transmission can be eliminated, thereby allowing people to be exposed to fewer dangerous diseases and other undesirable substances. In an alternative embodiment, the cover may be attachable to a water container inlet, and may receive the spout during filling, to be removed from the water container once filled.

In further embodiments, the covers may be provided in a stack of a plurality of nesting covers with one cover stacked into the next. This stack may be positioned on or adjacent to the water dispenser for easy access for users. In a particular embodiment, when stacked, the covers may have a sanitary wrapping such as a protective paper, plastic or other material separating them from the others. In this embodiment, a user may be able to touch the protective paper/plastic to remove the cover from the stack, place it on the water spout, and then remove the protective paper/plastic. This embodiment may provide additional sanitary protection by keeping a user's hands off the cover.

The cover may be made of any material capable of being connected to a water spout and withstanding the flow of a quantity of water. Examples of materials of which the cover may be made include, but are not limited to: paper, plastic, metals, wood, films, composite materials, and the like.

Turning now to FIG. 1 a perspective view of the spout and its orientation and connection to an embodiment of the spout cover is shown. The spout cover 10 is roughly conically shaped, having a spout mating end 11 with a greater cross-sectional diameter than an opposite end. Generally, an interior surface of the spout cover 10 aligns with the shape of the spout 12, allowing the cover 10 to frictionally connect to the spout 12. As shown in the broken lined view, cover 10 is frictonally attached to the spout 12 by a tight connection between the inner wall of the cover and outer wall of the spout. The spout 12 is connected to a water supply, and has a lever 13 or other actuator to control a flow of the water through the spout 12, and potentially spout cover 10 when in place. In other embodiments, different connections between the cover 10 and spout 12 may be employed. For example, the cover may have an interior protruding ring configured to snap or otherwise mate over the spout 12 or a protrusion on the spout 12. In another embodiment, a tacky, high friction, and/or adhesive substance, may be disposed about an interior of the cover 10 to better secure the cover to the spout 12. The cover 10 comprises a first end 14 having a wide opening. The first end 14 tapers inwardly at tapering portion 15 to a more narrow second opposite end 16.

FIG. 2 shows another embodiment of the invention mounted on a water dispenser. The water dispenser 20 has a water jug 21 on its top which provides water flow. However, in other embodiments, the water dispenser 20 may be directly connected to a water line that provides the water flow. A cup dispenser 22 is on a side of the water dispenser 20. Further, a cover dispenser 23 is also accessible on a front of the dispenser 20. The cover dispenser 23 comprises a cylindrical case with a stack of the covers 10 positioned therein, nested together one on top of the other. The cover dispenser 23 may have a tubular shape, and is configured to allow a user to remove one cover 10 at a time for use on the water dispenser 20. At a front of the water dispenser 20 are two water spouts 12, each controlled by a lever 13 or other actuator. A water spout cover 10 is frictionally secured over the water spout 12, with its mating end 11 disposed over the outer surface of the spout 12. The cover 10 further comprises a sanitary wrapping 30 to prevent a user from dirtying the cover 10 when they use their hands to remove it from the stack and place it on a water spout. This wrapping 30 may be removed once the cover 10 is fitted in place on the spout 12.

FIG. 3 provides a view of the water spout covers in a stacked position. In this view, the water spout covers 10 are stacked with a narrow end of one cover 10 fitting within the wider mating end 11 of another cover 10. Each cover 10 further comprises a sanitary wrapping 30 to prevent a user from dirtying the cover 10 when they use their hands to remove it from the stack and place it on a water spout. The sanitary wrapping 30 may be any material capable of preventing a transfer of microbes, dirt, oils and other undesirable material. The sanitary wrapping 30 may be any thin material capable of covering the cover 10. This wrapping 30 may also be easily removable once the cover 10 is mounted on the spout. For example, the wrapping 30 may have perforations to allow it to be easily broken away, or may have a twist-off removal configuration, or may slip away once the cover is removed from the stack, among other options. A cover dispenser 23 comprises a cylindrical case with a stack of the covers 10 and wrappings 30 positioned therein, nested together one on top of the other.

Figure 4:
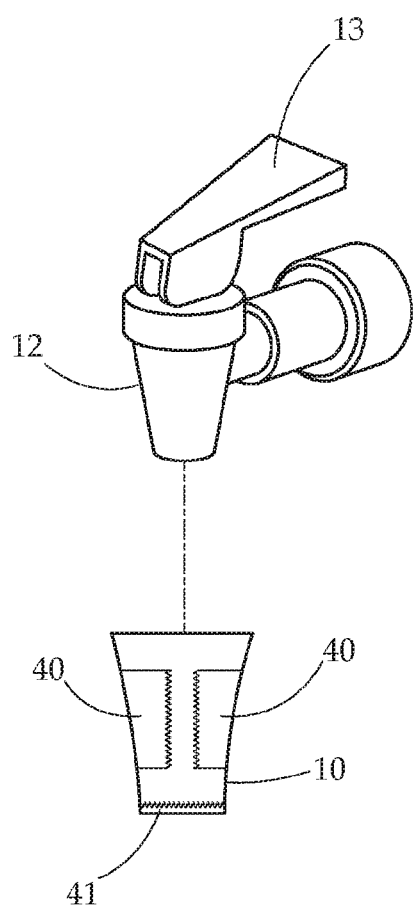
FIG. 4 provides a view of another embodiment of the cover wherein an interior of the cover comprises a flavoring for dilution into water poured through the spout.

FIG. 4 provides a view of another embodiment of the cover wherein an interior region defined by the cover comprises a flavoring for dilution into water poured through the spout. In this view, a flavoring powder 40 is disposed within the interior of the spout where water will pass through. In alternative embodiments, the flavoring may be a liquid, gel, or any other substance capable of delivering flavor to water poured over it. The cover has an optional membrane 41 formed of gelatin or other water soluble material. The membrane 41 may allow the water poured through to have an additional residence time within the cover 10 to expose it to the flavoring powder 40. In other embodiments, the membrane 41 may also prevent the flavoring powder 40 from escaping. In still other embodiments, the flavoring powder 40 may be configured to simply fall out of the cover 10 when exposed to water, falling into the container in which the water is being poured, for later dilution within the container.

Figure 5:
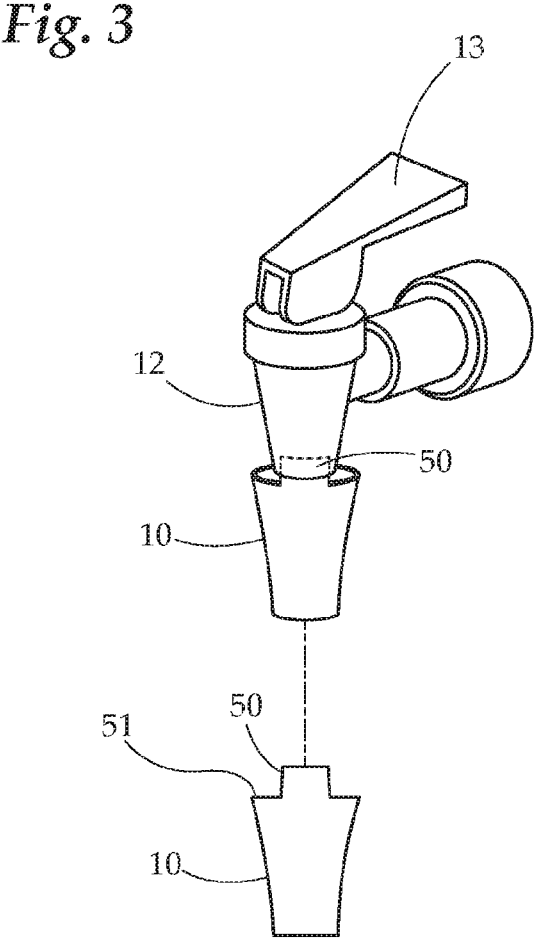
FIG. 5 provides a still anther embodiment of the cover.

FIG. 5 provides still another embodiment of the cover 10. In this embodiment, the cover 10 is configured to connect to the spout on its interior. As such a recessed portion 50 is sized to fit inside the spout. The cover extends outward as flange 51 and then tapers inwardly to fit inside the spout. In a further embodiment, edges of the cover 10 may extend upward at the outward extension flange 51, creating a channel between recessed portion, and the edge of the cover 10. This channel may be sized to frictionally receive the spout on its interior and exterior, as is shown in broken lines.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A water dispenser spout cover assembly comprising:
    a water dispenser comprising a body, a water source, and a water spout serving as a water outlet extending from the body;
    a water spout cover removably attached to the water spout, the water spout cover, having a wide opening on a first end, and a tapering portion which tapers inwardly to a narrow opening on a second opposite end, the wide opening having a greater cross sectional width than the narrow opening, the wide opening and tapering of the water spout cover being sized to snugly fit over the water spout; and
    a wrapping about an exterior of the water spout cover, the wrapping covering the tapering portion and second opposite end, and being open at the wide opening on the first end of the water spout cover.

2. The water dispenser spout cover assembly of claim 1 further comprising:
    a cover dispenser attached to the water dispenser body; and
    a plurality of stacked water spout covers removable from the cover dispenser.

3. The water dispenser spout cover assembly of claim 2 wherein the plurality of stacked water spout covers are removable from the cover dispenser one at a time.

4. The water dispenser spout cover assembly of claim 3 further comprising a plurality of wrappings, one wrapping about an exterior of each of the plurality of covers.

5. The water dispenser spout cover assembly of claim 4 wherein each of the plurality of wrappings is removable from the one of the plurality of covers to which each of the plurality of wrappings is attached.

6. The water dispenser spout cover assembly of claim 2 wherein the cover dispenser is a tubular dispenser.

7. The water dispenser spout cover assembly of claim 1 wherein the water spout cover is disposable.

8. The water dispenser spout cover assembly of claim 1 wherein the water spout cover is frictionally secured to the water spout.

9. The water dispenser spout cover assembly of claim 1 wherein a water soluble flavoring is positioned within an interior of the water spout cover.

10. The water dispenser spout cover assembly of claim 9 wherein the water soluble flavoring is a powder.

11. The water dispenser spout cover assembly of claim 9 wherein the water soluble flavoring is a liquid.

12. A water dispenser spout cover assembly comprising:
a water dispenser comprising a body, a water source, and a water spout serving as an outlet extending from the body; and
a water spout cover removably attached to the water spout, the water spout cover having a first end and a tapering portion which tapers inward to a narrow opening on a second opposite end, the first end having a recessed portion being sized to snugly fit into an opening the water spout, and having a flange extending outwardly from the recessed portion between the first end and the tapering portion;
a cover dispenser attached to the water dispenser body; and
a plurality of stacked water spout covers removable from the cover dispenser.

13. The water dispenser spout cover assembly of claim 12 wherein the plurality of stacked water spout covers are removable from the cover dispenser one at a time.

14. The water dispenser spout cover assembly of claim 13 further comprising a plurality of wrappings, one wrapping about an exterior of each of the plurality of covers.

15. The water dispenser spout cover assembly of claim 14 wherein each of the plurality of wrappings is removable from the one of the plurality of covers to which each of the plurality of wrappings is attached.

16. The water dispenser spout cover assembly of claim 12 wherein a water soluble flavoring is positioned within an interior of the water spout cover.

* * * * *